United States Patent [19]
Duhamel

[11] Patent Number: 6,035,976
[45] Date of Patent: Mar. 14, 2000

[54] BRAKE FOR SMALL LAND VEHICLES

[76] Inventor: Martin Duhamel, 602-2060 Bellwood Avenue, Burnaby, BC, Canada, V5B 4V2

[21] Appl. No.: 09/120,752

[22] Filed: Jul. 23, 1998

[51] Int. Cl.[7] ..................................... B60T 1/14
[52] U.S. Cl. .................. 188/5; 188/72.7; 280/87.042
[58] Field of Search ................. 188/5 OR, 32, 188/19, 72.7; D34/23; 280/11.2, 11.22, 33.994, 87.042

[56] References Cited

U.S. PATENT DOCUMENTS

| | | | |
|---|---|---|---|
| 3,194,349 | 7/1965 | Kershner et al. | 188/71.8 |
| 3,425,519 | 2/1969 | Frigger | 188/106 F |
| 3,543,285 | 11/1970 | Frigger | 188/106 F |
| 3,664,464 | 5/1972 | Southard | 188/5 |
| 4,043,566 | 8/1977 | Johnson | 280/87.042 |
| 4,099,734 | 7/1978 | Lowery | 188/5 |
| 4,593,795 | 6/1986 | Cox, Jr. | 188/71.3 |

*Primary Examiner*—Christopher P. Schwartz
*Assistant Examiner*—Thomas J. Williams

[57] ABSTRACT

A brake is constructed so that a brake pad contacts the road surface by moving down an inclined plane. The geometry of the design results in a braking force that is large in comparison to the force applied by the user of the brake, allowing for very quick stops. The brake has particular utility for streetluges and go-carts, but could also be used on roller skates, inline skates, and skateboards.

3 Claims, 2 Drawing Sheets

BRAKE FOR SMALL LAND VEHICLES

FIELD OF THE INVENTION

This invention relates to brakes for small land vehicles such as street luges, go-carts, roller skates, inline skates, and skateboards. The brake has particular utility for high-speed vehicles such as street luges and go-carts because the geometry of the design produces very high braking forces allowing the vehicle to stop quickly. The brake is most applicable to simple vehicles for which disc brakes and/or a hydraulic braking system are too complex to be practical.

BACKGROUND OF THE INVENTION

Street luge, also known as road luge or land luge, is a sport in which participants ride down hills while sitting or lying on a device that resembles a long skateboard. The sport resembles traditional ice luge in that participants are sitting or lying down (usually feet first) on a sled. The sport resembles skateboarding because the sled has wheels and because the rider turns the sled by leaning his body weight to the left or right.

As equipment improves, so does the speed of the sport. Riders often reach speeds of 60 to 80 MPH assuming they have a hill that's long enough and steep enough.

Traditionally, street luges don't have brakes—riders stop by pressing their feet to the road surface. This is a moderately effective way of stopping, but is often not perceived as safe by people unfamiliar with the sport. A satisfactory braking system would help give the sport an image of safety.

DESCRIPTION OF THE PRIOR ART

There is no mention in the art of braking systems specifically for the sport of street luge. However, there is mention of braking systems for other vehicles, which could conceivably he applied to street luges.

U.S. Pat. No. 5,388,673 discloses a brake that consists of a pole with a brake pad affixed to one end. A person wearing roller skates, for instance carries the pole and slows down by pressing the brake pad against the ground. Such a brake is impractical for street luge because a pole cannot be carried safely by a street luge pilot, nor could the pole be pressed against the ground with much force from the supine position of the street luge pilot.

There are more than a hundred patents, in categories 188/5,280/11.2, and 280/11.22 for example, for inline-skate brakes where the brake pad is brought into contact with the road by pivoting it around a certain point, usually the rear wheel. In some cases, such as U.S Pat. No. 5,253,883 of Moldenhauer, the entire skate is pivoted around the rear wheel. In other cases, such as U.S. Pat. No. 5,487,552 of Daoust, a sub-assembly is pivoted around the rear wheel or second-to-rear wheel The present invention improves upon all these brakes by using an inclined plane rather than a pivot, generating much higher braking forces and allowing the vehicle to stop much more quickly.

U.S. Pat. No. 5,330,207 of Mitchell discloses a hand-activated brake for inline skates. The skater squeezes a hand lever that pulls a brake pad vertically down into contact with the road surface. The present invention improves over Mitchell's brake by adding an inclined plane, which generates higher braking forces.

U.S. Pat. No. 5,649,715 of Mitchell discloses a brake for inline skates where the brake pad assembly is pushed vertically down into contact with the road surface. Again, the present invention improves over Mitchell's brake by adding an inclined plane.

SUMMARY OF THE INVENTION

It is an object of the present invention to

1. Generate a braking effect by moving a brake pad into frictional contact with a surface of motion.
2. Generate a braking force that is proportional to the force that is applied by the user of the brake (as opposed to a braking force that is either "on" or "off").
3. Generate a braking force which is large and is therefore able to stop a high-speed vehicle.

BRIEF DESCRIPTION OF THE DRAWINGS

Shown in the drawings are the embodiments of the invention that are presently preferred. However, the invention is not limited to the precise arrangements shown in the drawings.

DETAILED DESCRIPTION

Figure 1:
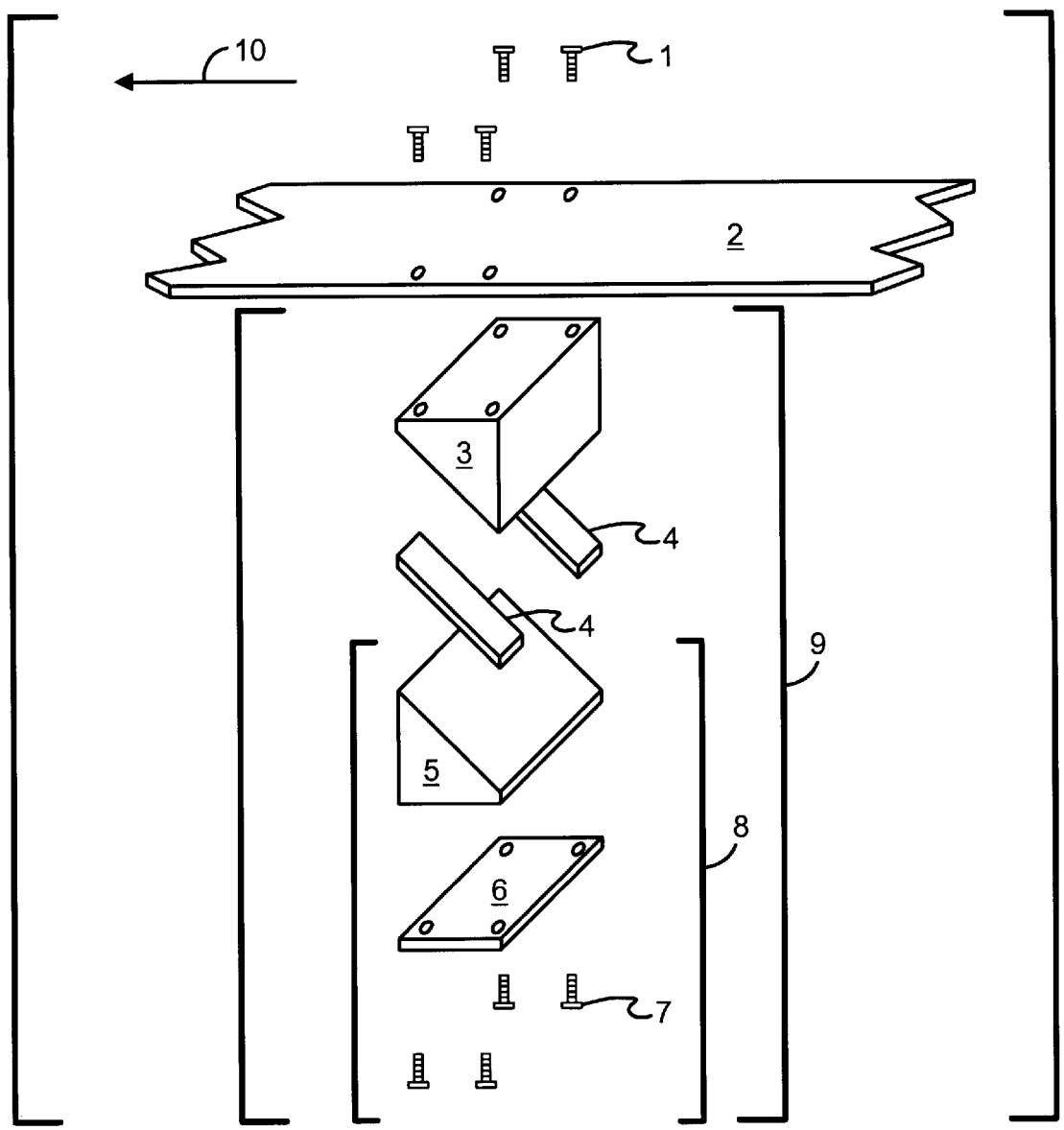
FIG. 1. is an exploded view of an embodiment of the brake.

Referring to FIG. 1, the embodiment of the brake 9 has a brake pad assembly 8 consisting of a brake pad 6 connected with screws 7 to the lower component 5. The lower component 5 is slidably connected to the upper component 3 by means of bearings 4. The brake 9 is connected with screws 1 to the chassis of the vehicle 2. In the embodiment shown in FIG. 1, the upper and lower components 3 and 5 are solid aluminum; the brake pad 6 is rubber. The bearings 4 are commercially-available linear slide bearings and their construction is not described further. The means for returning the friction pad 6 from a deployed position to a stowed position is a spring.

The plane in which the bearings 4 slide is the inclined plane that is referred to within this document. The angle of inclination is measured relative to a horizontal plane that extends positive in the direction of motion 10 of the vehicle. For example, the brake of FIG. 1 has a 45° (approximate) inclination.

Figure 2:
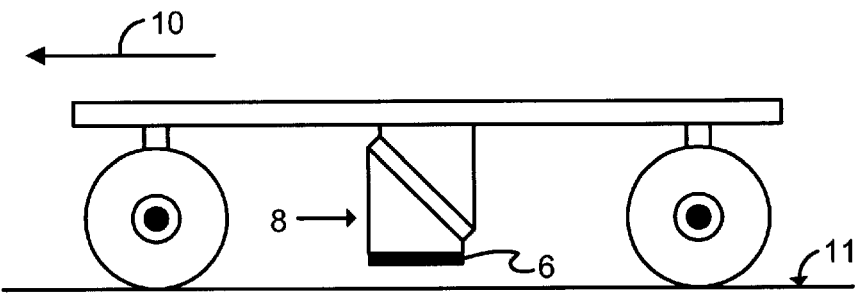
FIG. 2. is a side view of an embodiment of the brake in the stowed position.

FIG. 2 shows the embodiment of the brake from FIG. 1 where the brake pad assembly 8 is in its stowed position. In particular, the brake pad assembly 8 is at its highest point along the inclined plane and the brake pad 6 is not in contact with the surface of motion 11.

Figure 3:
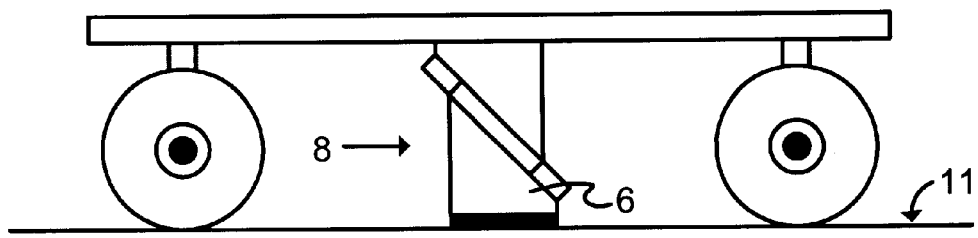
FIG. 3. is a side view of an embodiment of the brake in the deployed position.

FIG. 3 shows the embodiment of the brake from FIG. 1 where the brake pad assembly 8 is in its deployed position. In particular, the brake pad assembly 8 has been lowered to the point where the brake pad 6 is in frictional contact with the surface of motion 11.

Figure 4:
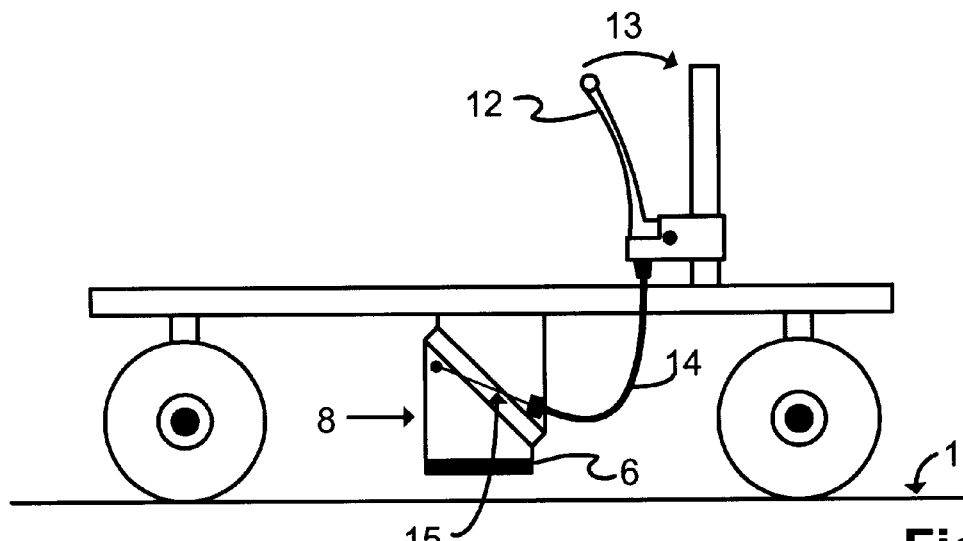
FIG. 4. is a side view of an embodiment of the brake that is activated by a cable that pulls the brake pad assembly into contact with the surface of motion.

FIG. 4 shows an embodiment of the brake that is activated by a cable that pulls the brake pad assembly 8 and in particular the brake pad 6 into contact with the surface of motion 11. Activation occurs when the hand lever 12 is moved as shown by arrow 13. The hand lever 12, cable housing 14, and cable 15 are similar to those used on a bicycle and are well known to those skilled in the art.

Figure 5:
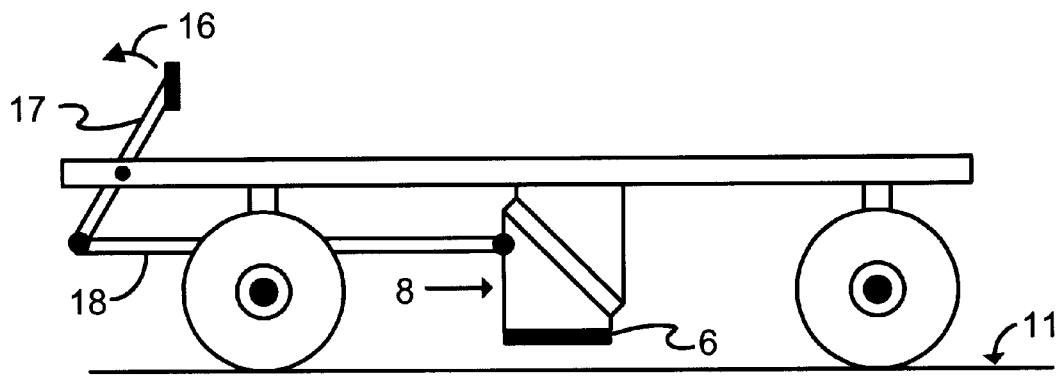
FIG. 5. is a side view of an embodiment of the brake that is activated by a pushrod that pushes the brake pad assembly into contact with the surface of motion.

FIG. 5 shows an embodiment of the brake that is activated by a pushrod 18 that pushes the brake pad assembly 8 and in particular the brake pad 6 into contact with the surface of motion 11. Activation occurs when the lever 17 is moved as shown by arrow 16.

It should be noted that the term "surface of motion" does not necessarily refer to the surface being traversed by the vehicle. Instead, it could refer to another moving part of the vehicle that is directly or indirectly in contact with the surface being traversed. For example, the brake may he designed to rub against a wheel rather than rubbing against the road surface directly.

I claim:

1. A brake for a vehicle traversing a surface, said brake having an inclined plane, having a friction pad movable along said inclined plane, having means for moving said friction pad from its stowed position at the top of said inclined plane to its deployed position where it contacts said surface, and having return means for moving said friction pad back to its stowed position and wherein the means for returning said friction pad from its deployed position to its stowed position is a spring.

2. A brake as in claim 1 wherein the means for moving said friction pad along said inclined plane is a pushrod or cable.

3. A brake as in claim 1 wherein a lever is used to gain mechanical advantage in moving said friction pad.

* * * * *